Aug. 10, 1965

A. H. WILLINGER 3,199,678

WATER TREATMENT UNIT

Filed Aug. 7, 1961

INVENTOR.
ALLAN H. WILLINGER
BY
Friedman & Goodman
ATTORNEYS

United States Patent Office 3,199,678
Patented Aug. 10, 1965

3,199,678
WATER TREATMENT UNIT
Allan H. Willinger, New Rochelle, N.Y., assignor to Aquariums Incorporated, Maywood, N.J., a corporation of Delaware
Filed Aug. 7, 1961, Ser. No. 129,803
3 Claims. (Cl. 210—169)

The present invention relates in general to aquarium filtering devices of the type which are disposed beneath the surface of the aquarium bed so that the bed itself serves as the filter material and, in particular, to medicament applicators or dispensers, as well as degassing cartridge units for such filtering devices.

In my prior U.S. Patent No. 2,935,199, issued May 3, 1960, there is disclosed an undergravel filter device of the type to which the present invention relates, said device being provided with a disposable degassing, decolorizing and colloidal suspension removing unit. The suction action which is described in my undergravel filter device has proven to be so effective that at times relatively small particles of refuse or sewage have been drawn through the gravel filter bed, especially when the sand on the bottom is disturbed by new plantings or large catfish foraging for food, so as to flow through the degassing unit with the discharge of the filter water. This has resulted in the entrapment of said particles in the material provided in the degassing unit with the result that the degassing unit may become clogged. This of course will tend to decrease the water flow through the degassing unit and may cause the air bubbles to back up so as to dislodge material which is collected on the gravel filter bed if such air bubbles are back up through the chamber provided below the filter bed. This causes some of the waste matter to be released into the water of the aquarium and this of course is undesirable.

In view of the foregoing, it is an object of the present invention to obviate the foregoing difficulties.

It is another object of the present invention to provide for a water conditioning cartridge unit as indicated above, which, although it may become clogged due to the aforesaid causes, will nevertheless not roll or disturb the sewage or waste material which is collected on the underwater gravel filter bed.

It is a further object of the present invention to provide an improved water treating, degassing, etc. unit for an underwater gravel filter device which will greatly enhance the utility of the device.

It is also an object of this invention to provide a unit of the character indicated which is particularly adapted for introducing chemical materials in the nature of water conditioners, medicines, food supplements, etc. into the main body of aquarium water at a gradual and controlled rate and over an extended period of time.

Other and further objects and advantages of the present invention will be readily apparent to those skilled in the art from a consideration of the following specification taken in connection with the appended drawings.

Referring now to the drawings which represent the presently preferred embodiment of the present invention:

Figures 1, 2, 3, 4:
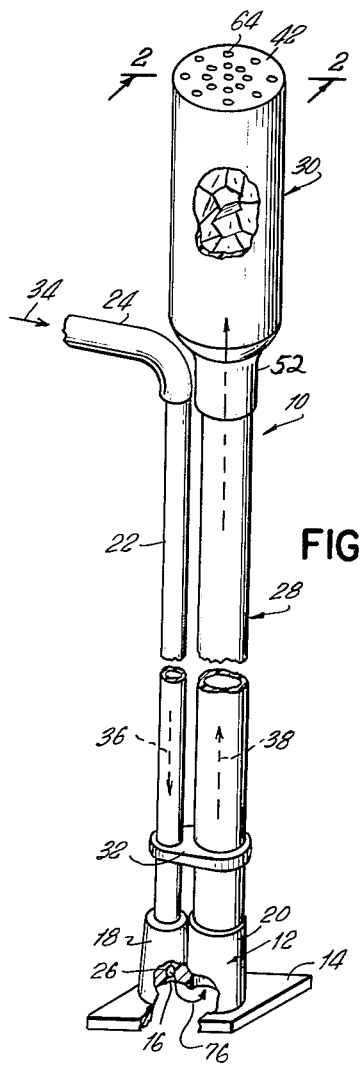
FIGURE 1 is a perspective view of a cartridge unit pursuant to the present invention provided on the return water flow conduit of an under water gravel filter device, portions being broken away for purposes of illustration.
FIGURE 2 is a sectional exploded view on an enlarged scale taken on the line 2—2 of FIGURE 1.
FIGURE 3 is a top plan view of a portion of the unit taken on the line 3—3 of FIGURE 2.
FIGURE 4 is a sectional view similar to FIGURE 2 but illustrating the degassing unit in assembled condition.

Referring now to the drawings in detail, there is shown a filter assembly unit 10 for use with an undergravel filter device of the type illustrated and described in my previously identified patent. Said device comprises a housing 12 which is provided with a flat base 14 which is adapted to be releasably locked in position over an aperture provided in the bed of the undergravel filter device for communication with the chamber provided below the gravel bed into which the filtered water is drawn, as illustrated and described in detail in my prior patent. The housing 12 defines an open chamber 16 which communicates with the chamber below the bed of the undergravel filter device. More specifically, the housing 12 is constituted by the companion bosses 18 and 20. Each of said bosses is provided with a companion bore, the diameter of the bore in boss 18 being less than the diameter of the bore in boss 20. An air inlet tube 22 is seated in the bore provided in boss 18, the upper end of the tube being connected by means of a flexible conduit 24 to an air pump (not illustrated) or other air supply source. The lower end of tube 22 is in air flow communication with the housing 12 by means of a channel 26 provided in the boss 18.

Boss 20 mounts the lower end of a return water flow tube 28. At its upper end, the return water flow tube is provided with a degassing unit 30 pursuant to the present invention. Tubes 22 and 28 are retained in position by means of a double collar 32.

From the foregoing, it will be understood that air is supplied through the conduit 24, as indicated by the arrow 34 to the air inlet tube 22. The air flows down through the tube as indicated by the arrow 36 emerging into the housing 12 through the channel 26. The housing is filled with filtered water, the air from the conduit 22 entering the water in the form of bubbles which then flow upwardly through the tube 28 as indicated by the arrow 38 for carrying the filtered water upwardly through the tube to discharge the latter at a point above the filter gravel bed as described in my prior patent.

As here shown, the water treating or conditioning unit 30 is constituted by a cartridge having a tubular body 40 which is closed at the end 42 and open at the end 44 thereof. The open end 44 is closed by means of a cap 46. In this connection, it will be noted that the body portion 40 is provided with a step or shoulder 48 at its open end for receiving a complementary stepped portion 50 provided on the cap 46. The cap 46 is provided also with a tubular neck 52 which is adapted to frictionally engage over the upper end 54 of the return flow water conduit 28. It will be noted that the cap 46 is provided with a wall portion 56 which extends transversely of the tubular neck 52 and which is apertured as at 58, so as to permit for the passage of the water and air upwardly through the conduit 28 and into the cartridge 30. Pursuant to a highly novel and advantageous feature of the present invention, the neck 52 is provided with a collar portion 60 which extends into the cap 46 upwardly from the wall portion 56, as best shown in FIGURES 2, 3 and 4. The cap 46 is also apertured as at 62 outwardly of the inner collar 60, for a purpose which will be presently described. In addition to the inlet apertures 58, the cartridge 30 is provided also with outlet apertures 64 which are defined in the closed end wall 42 of the body portion 40.

Prior to its use in the filter system, the body portion 40 of the cartridge 30 is filled with a suitable degassing material 66, such as for example, and not by way of limitation, activated charcoal or other suitable material for removing the gasses, colors and colloids formed within the aquarium water as a result of the decomposition of sewage products by bacterial action. After the cartridge body is filled and closed by means of the cap 46, the cartridge is then inverted so that the neck 52 of the cap 46 is engaged over the upper end 54 of the return water conduit 28, as best shown in FIGURES 1 and 4.

With the cartridge so inverted, the particles or crystals of the degassing material move down toward the wall portion 56 of the cap 46 and the adjacent wall portion of the cap. However, it will be noted that due to the upstanding collar 60, which extends within the cap 46, the granules are spaced upwardly from the underlying wall portion 66 of the cap so as to define therewith an open chamber 68 about the inner collar 60. Said chamber has exterior communication through the apertures 62.

The collar also serves the purpose of preventing the immediate egress of air and water prior to its circulation through at least a portion of the granular material, unless the granular material is clogged. In that event, the air and water merely pass over the collar and escape through apertures 62.

When the filter unit 10 is in position and in operation as a portion of an operating undergravel filter device, it will be understood that the air bubbles which enter the chamber 16 through the air inlet conduit 22, will push or move the filtered water upwardly into the return water conduit 28 as described in my prior patent. The filtered water and the air bubbles will enter the cartridge 30 through the apertures 58 in the wall portion 56 which extends across the neck 52 of the filter cartridge so as to break up the larger air bubbles which pass upwardly through the degassing, etc. materials 66 with the water which is pushed upwardly through said materials by said broken-up air bubbles, the degassed water and air bubbles then flowing out through the apertures 64 in the upper wall 42 of the cartridge as indicated by the arrow 70, the arrow 72 indicating the water flow upwardly into the cartridge through the apertures 58 as indicated by the arrow 74 and the arrow 76, indicating the flow of air bubbles from the air inlet tube 22 up through the return water flow tube 28.

Pursuant to a highly important feature of the present invention, in the event that the degassing, etc. material 66 should trap a sufficient amount of sewage particles or other foreign material so as to clog the passage of air and water therethrough, it will be impossible for the air to back up through the conduit 28 and discharge through the chamber 16 into the chamber which is formed below the filter gravel bed so as to move upwardly through the bed and thereby return the filtered material settled on the bed back into the aquarium water. This is due to the fact that in the event that the cartridge 30 should become clogged, the previously described chamber 68 formed between the material 66 and the underlying wall portion 67 of the cap 46 will receive the air which cannot pass upwardly through the cartridge and the air will then be discharged from the chamber 68 through the underlying apertures 62, as indicated by the arrow 78. As illustrated and described in my prior patent, the upper end of the return water flow conduit 28 is above the gravel filter bed; consequently, the return flow of air will return to the filter water above the gravel bed so as not to disturb or dislodge the foreign or waste material filtered thereon. Such a clogged condition of the cartridge 30 will be readily apparent due to the fact that no air bubbles will be seen to rise upwardly from the cartridge 30. When said condition is apparent, the cartridge 30 may be removed for replacement by a new cartridge or it may be cleaned and then replaced so that the filtering action may then continue at maximum efficiency.

The instant device is also particularly adapted for use as an applicator or metering dispenser for introducing conditioning or medicinal materials into the aquarium for the treatment of fish contained therein. It is considered to be very desirable that such materials be introduced into an aquarium at a controlled rate so as to prevent sudden changes in the environmental conditions of the fish which might produce shock or other undesirable side effects upon the aquatic life. An example of such material would be quinine hydrochloride which is used to treat a common parasitic disease of fish, such as ichthyophthirias multifilis. This medicinal material is granular in form and it is extremely desirable that the material be introduced at a slow rate into the aquarium to prevent a sudden environmental change and it is also desirable that the material be fed into the aquarium water over a prolonged period in order to provide for an extended treatment. Other medicinal materials or dietetic supplements such as vitamins or plant foods may be of similar form or incorporated in capsules or tablets. All of these materials may be readily introduced into the interior of the unit either independently of or in association with carbon granules and the passage of water through the unit will result in the slow and continuous solution of the treating materials in the aquarium water. This manner of gradually introducing and constantly treating the aquarium water presents a high desirable arrangement for the effective solution or dissemination of these materials. In many forms of parasitic or fungoid diseases of fish, it has been found that there is a tendency for these deleterious bodies to concentrate at the bottom of the aquarium. The instant arrangement is particularly effective under these conditions as when employed in conjunction with an undergravel filter plate, since the aquarium water at the bottom of the tank is drawn upwardly and immediately subjected to the treatment of the desired chemical materials in the unit. A most effective treating zone is thus established for the aquarium water at the point of maximum infestation. The treating chamber is also particularly effective in introducing medicinal materials which are lighter than water and would normally tend to float at the surface of the aquarium water. By confining the medicinal material within the chamber of the unit, the aquarium water may be effectively treated and particularly the aquarium water at the bottom of the tank as it is drawn up and percolated through the chamber. It is important to note that he granular medicinal maerials would normally tend to float upwardly in the rising stream of air and water in the chamber and would consequently tend to clog the holes 64 in the top wall of the unit. By providing holes 62, water and air are nevertheless allowed to escape in spite of the fact that the holes 64 may have thus become clogged and the chemical treating materials slowly dissolve in the water and are introduced into the main body of aquarium water in a gradual fashion and at a slow rate. It will be evident that another of the significant advantages of this arrangement resides in the fact that the concentration of undissolved chemicals in any one spot in the aquarium where it may come into contact with the fish is avoided. By the same token, rapid changes in the chemical balance of the aquarium are avoided. Since the medicinal materials are sealed within the relatively large unit, they are prevented from being accidentally swallowed by children.

While I have illustrated and described the presently preferred embodiment of my invention, it will be apparent that changes and modifications may be made therein without however departing from the spirit and scope of the invention as set forth in the appended claims.

I claim:

1. An aquarium water treatment assembly comprising a housing having a water inlet, a water outlet conduit for said housing extending upwardly therefrom to a water discharge end thereof, an air inlet conduit provided on said housing to supply air thereto for causing the water therein to flow up said water conduit to the discharge end thereof, and a cartridge adapted to contain granular treatment material, said cartridge being provided on said water conduit, said cartridge having an inlet end containing apertures therein and coterminous with said water conduit discharge end and an apertured outlet end spaced upwardly from said inlet end thereof for the flow of air and water upwardly through said cartridge from the discharge end of said water conduit, a tubular collar coaxial with said water conduit and provided within said cartridge at said inlet end thereof, said tubular collar encompassing said inlet end apertures of said cartridge so as to space granular treatment material upwardly from the inner surface of the inlet end of said cartridge, and a discharge aperture defined in said cartridge adjacent to and outwardly of said collar to discharge air and water from said cartridge adjacent to said inlet end thereof if the flow passage to the outlet end of said cartridge is blocked.

2. An aquarium water treatment assembly as in claim 1, said cartridge having a neck projecting downwardly therefrom at said inlet end thereof, said discharge end of said water conduit being engaged with said neck, the inlet apertures for said cartridge being encompassed by said neck, and said discharge aperture at the inlet end of the cartridge being defined therein outwardly of said neck.

3. An aquarium treatment assembly as in claim 2, said neck and said collar being contiguous.

References Cited by the Examiner

UNITED STATES PATENTS

| | | | |
|---|---|---|---|
| 1,821,082 | 9/31 | Tyler | 210—130 |
| 2,770,366 | 11/56 | Puzarowski | 210—169 |
| 2,935,199 | 5/60 | Willinger | 210—169 |
| 2,995,250 | 8/61 | Boewe et al. | 210—130 |
| 3,006,476 | 10/61 | Halpert | 210—169 |

REUBEN FRIEDMAN, *Primary Examiner.*

HERBERT L. MARTIN, *Examiner.*